(12) United States Patent
Chasko et al.

(10) Patent No.: US 8,719,938 B2
(45) Date of Patent: May 6, 2014

(54) DETECTING NETWORK INTRUSION USING A DECOY CRYPTOGRAPHIC KEY

(75) Inventors: Stephen Chasko, Marietta, GA (US); Michael Demeter, Johns Creek, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 13/442,256

(22) Filed: Apr. 9, 2012

(65) Prior Publication Data

US 2013/0269032 A1    Oct. 10, 2013

(51) Int. Cl.
*G08B 23/00* (2006.01)

(52) U.S. Cl.
USPC ............... 726/23; 726/22; 713/189; 713/194

(58) Field of Classification Search
None
See application file for complete search history.

(56) References Cited

U.S. PATENT DOCUMENTS

| | | | |
|---|---|---|---|
| 6,343,281 B1 * | 1/2002 | Kato ............................... 705/57 |
| 8,472,619 B1 * | 6/2013 | Trimberger ...................... 380/28 |
| 2004/0174998 A1 * | 9/2004 | Youatt et al. .................. 380/210 |
| 2005/0166072 A1 * | 7/2005 | Converse et al. ............. 713/201 |
| 2007/0271614 A1 * | 11/2007 | Capalik .......................... 726/23 |
| 2007/0288768 A1 * | 12/2007 | Nesta et al. ................... 713/194 |
| 2009/0003591 A1 * | 1/2009 | Murakami et al. .............. 380/28 |
| 2009/0328204 A1 * | 12/2009 | Taoka ............................. 726/22 |
| 2012/0078548 A1 | 3/2012 | Salazar et al. |
| 2012/0201380 A1 * | 8/2012 | Kohiyama ..................... 380/255 |

FOREIGN PATENT DOCUMENTS

WO    2013154851    10/2013

OTHER PUBLICATIONS

International Patent Application No. PCT/US2013/034767, International Search Report & Written Opinion, issued Jun. 19, 2013, 11 pages.
Yang et al., "A Distributed Honeypot System for Grid Security", Grid and Cooperative Computing; [Lecture Notes in Computer Science; LnCS], Springer-Verlag, Berlin/Heidelberg, Apr. 17, 2004, pp. 1083-1086.

* cited by examiner

*Primary Examiner* — Philip Chea
*Assistant Examiner* — Khoi Le
(74) *Attorney, Agent, or Firm* — Kilpatrick Townsend & Stockton LLP

(57) ABSTRACT

Systems and methods for detecting intrusion into a data network are disclosed. Such intrusion can be detected, for example, by providing at least two network devices in a data network. Each of the network devices has a decoy cryptographic key that is used to detect unauthorized data and an authentic cryptographic key that is used to encrypt authorized data. The first network device receives data from the second network device that is encrypted using the decoy cryptographic key. The first network device determines that the data is encrypted using the decoy cryptographic key. The first network device deletes or otherwise discards the data encrypted using the decoy cryptographic key. The first network device can generate an alert message instructing other network devices that the second network device is generating the unauthorized data. The alert message also instructs the other network devices to ignore data originating from the second network device.

20 Claims, 4 Drawing Sheets

DETECTING NETWORK INTRUSION USING A DECOY CRYPTOGRAPHIC KEY

TECHNICAL FIELD

This disclosure relates generally to computer software and more particularly relates to detecting intrusion into a data network by using a decoy cryptographic key.

BACKGROUND

Information security can be provided on data networks using encryption protocols. An encryption protocol can be used to encode data transmitted via a data network in such a way that only an entity with a decryption key can decode the data.

A threat to the information security of a data network can be the disclosure of cryptographic keying data and the mechanisms used to process the keying data. An intruder gaining access to such cryptographic keying data can intercept and decrypt data, thereby compromising the security of communication via the network.

One solution for preventing such disclosure is to physically secure a network device. Physically securing a network device can include physically monitoring the network device or adding physical safeguards, such as a locking mechanism, to the network device. Such solutions, however, can increase the expense associated with manufacturing a network device or limit the flexibility of deploying a network device. Furthermore, such solutions do not provide a method for detecting or reacting to an intrusion into the data network if physical safeguards fail.

SUMMARY

Systems and methods are disclosed for using a decoy encryption key to detect intrusion into a data network. An exemplary system includes a first network device and a second network device of a data network. Each of the first network device and the second network device has a decoy cryptographic key and an authentic cryptographic key. The decoy cryptographic key is used to detect unauthorized data being transmitted in the data network. The authentic cryptographic key is used to encrypt authorized data being transmitted in the data network. The first network device receives data from the second network device that is encrypted using the decoy cryptographic key. The first network device determines that the data is encrypted using the decoy cryptographic key. The first network device discards the data encrypted using the decoy cryptographic key.

In additional or alternative aspects, the first network device generates an alert message. The alert message instructs one or more additional network devices that the second network device is generating the unauthorized data. The alert message also instructs one or more additional network devices to ignore data originating from the second network device.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
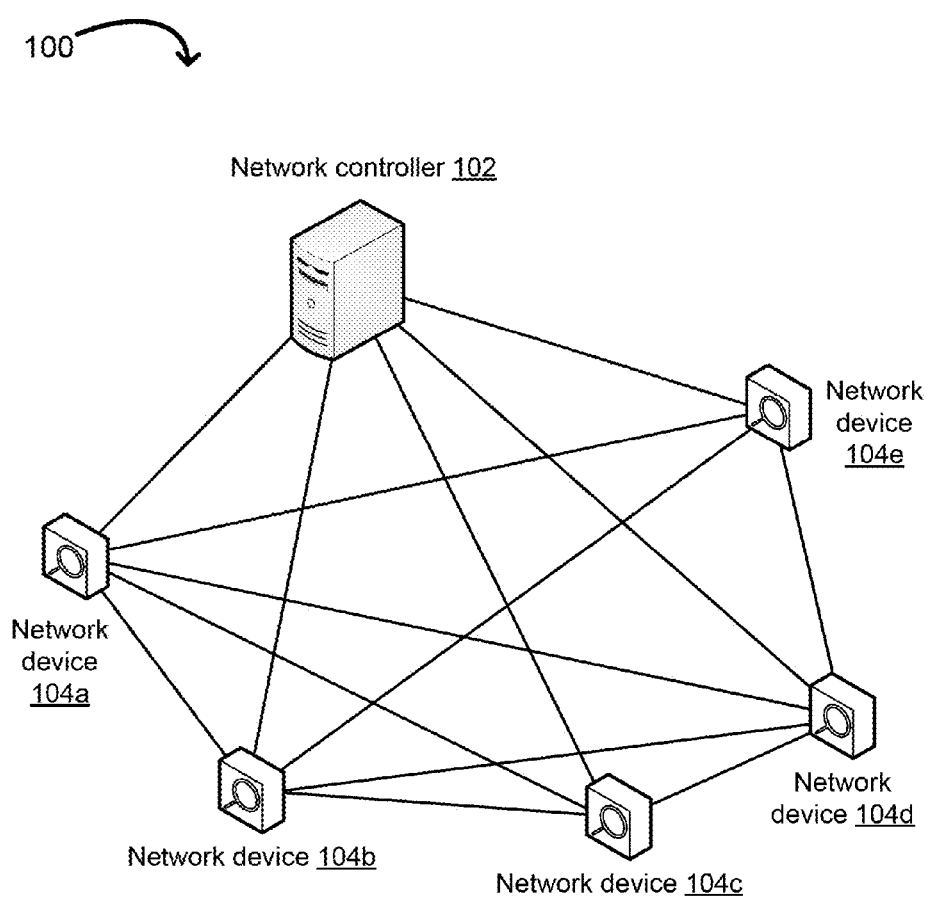
FIG. 1 is a network diagram illustrating an exemplary data network having network controller in communication with network devices.

Systems and methods are provided for detecting intrusion in a data network using a decoy cryptographic key. The systems and methods can detect that a device in the data network has been compromised by determining that the device is transmitting data encrypted using a decoy cryptographic key. In response to detecting that a device has been compromised, the compromised device can be isolated from the network.

The following example illustrates how a compromised network device can be detected using a decoy cryptographic key. Each of the devices in a data network can include a storage device configured to store software for communicating via the network. Data to be communicated via the data network can be encrypted using a cryptographic key stored in the storage device. The storage device can also include a decoy cryptographic key. The decoy cryptographic key can be stored in such a manner that an intruder analyzing data stored in the storage device will be more likely to discover and use the decoy cryptographic key than an authentic cryptographic key used to encrypt authorized data. For example, a decoy cryptographic key can be generated using high entropy data. The decoy cryptographic key can be stored as high entropy data in a region of a memory with data commonly associated with the presence of a cryptographic key, such as a region of a computer-readable medium or other memory having high entropy data. The storage device can also include decoy code. The decoy code can refer to the memory region in which the decoy cryptographic key is stored. The decoy cryptographic key can be used with the decoy cryptographic key, thereby inducing the intruder to believe that the decoy cryptographic key is used to encrypt authorized data on the data network. The intruder can encrypt data using the decoy cryptographic key and communicate the data encrypted using the decoy cryptographic key. Another device in the data network can determine that the data is encrypted using the decoy cryptographic key rather than the authentic cryptographic key. The device detecting the use of the decoy cryptographic key can generate an alert message instructing other network devices to ignore data originating from the compromised network device. Examples of a compromised network device can include (but are not limited to) a device in a data network being misused by an intruder, a foreign device introduced into the network by an intruder, etc.

In an exemplary system, a data network can include a first network device and a second network device. Each of the first network device and the second network device can include a memory having a decoy cryptographic key and an authentic cryptographic key stored thereon. The decoy cryptographic key can be used to detect unauthorized data being transmitted in the data network. The authentic cryptographic key can be used to encrypt authorized data being transmitted in the data network. The first network device can receive data from the second network device. The first network device can determine that the data from the second network device is encrypted using the decoy cryptographic key. For example, the first network device can attempt to decrypt the data received from the second network device using an authentic cryptographic key. The first network device can determine that the authentic cryptographic key cannot be used to decrypt the data. The first network device can decrypt the data using the decoy cryptographic key. Decrypting the data using the decoy cryptographic key can indicate that the second network device transmitting the data has been compromised. The first network device can delete or otherwise discard the data encrypted using the decoy cryptographic key, thereby isolating the compromised network device.

In additional or alternative aspects, the first network device can generate an alert message. The alert message instructs one or more additional network devices that the second network device is generating the unauthorized data. The alert message also instructs one or more additional network devices to ignore data originating from the second network device. For example, a network controller can be notified that the second network device has been compromised. The network controller can take corrective action to isolate the compromised network device.

As used herein, the term "cryptographic key" is used to refer to data that determines the functional output of a cryptographic algorithm or cipher used by an encryption protocol or encryption algorithm. A cryptographic key can specify the transformation of information to be transmitted into a form that is unreadable without the cryptographic key. The cryptographic key can be used to encrypt and decrypt data.

As used herein, the term "encryption protocol" is used to refer to any algorithms or group of algorithms for transforming data so as to make the data unreadable to any entity not having one or more cryptography keys for transforming the unreadable data into a readable format, to provide one or more integrity checks using a cryptographic key to validate the integrity, to provide a group identity that can use a cryptographic key to validate the source of the data originating from a group member, and/or to provide proof of origin such that a cryptographic key can be used to validate the source of a message. Examples of an encryption protocol can include (but are not limited to) Advanced Encryption Standard ("AES"), Data Encryption Standard ("DES"), Hash-based Message Authentication Code ("HMAC"), elliptical curve cryptography ("ECC"), etc.

As used herein, the term "network device" is used to refer to any device capable of communicating with other devices via a data network.

As used herein, the term "data network" is used to refer to a group of devices interconnected by communication channels that allow sharing of resources and information. A communication channel can include any suitable means for communicating data over network, such as (but not limited to) a copper cable, a fiber optic cable, a wireless transmission, etc.

In additional or alternative aspects, isolating the compromised network device can include providing the alert message to one or more additional network devices. The alert message can instruct the one or more additional network devices to cease routing data originating from the compromised network device. For example, in a mesh network, one or more uncompromised network devices in communication with the compromised network device can be instructed to delete or otherwise discard any data packets originating from the compromised network device, thereby isolating the compromised network device from the network.

An alert message can also be used to identify a foreign device introduced into a data network by an intruder that is used to communicate data that is encrypted using the decoy cryptographic key. Data communicated from the foreign device can include information used to identify the foreign device. An example of information used to identify the foreign device can include a network address or other device identifier associated with the foreign device. The information used to identify the foreign device can be extracted from data communicated by the foreign device. The information used to identify the foreign device can be included in the alert message. The alert message can be provided to a network controller to document the intrusion of the foreign device into the data network.

In additional or alternative aspects, isolating the compromised network device can include analyzing traffic from the network device to determine that the network device is providing fraudulent data. A processor can compare data received from the network device to a data profile associated with the compromised network device. The processor can determine that data received from the compromised network device have values differing from expected values determined from the data profile. Based on determining that the data differs from the expected data, the alert message can be provided to other network devices of the data network. For example, a network controller in a power distribution network, such as a server, can compare data from a network device, such as the power consumption data from a smart meter, to a data profile including an expected power usage generated based on historical power consumption data recorded by the smart meter. The network controller can determine that the power consumption rate is lower than the historical average, which may indicate that the compromised network device is being used to send fraudulent power consumption data. The network controller can isolate the meter based on identifying the potentially fraudulent data.

In additional or alternative aspects, a network controller or other network device can determine a geographic location of the compromised network device. The network controller can determine the geographic location based on a distance from the compromised network device to each of at least two uncompromised network devices at known geographic locations. For example, a network controller can direct each of the uncompromised network devices to send a test signal to the compromised network device. The distance from each of the uncompromised network devices to the compromised network device can be determined based on the time elapsed between each network sending the test signal to the compromised network device and receiving a reply from the compromised network device. The network controller can triangulate the position of the compromised network device based on the distance between the compromised network device and each of the uncompromised network devices and the geographic locations of the uncompromised network devices.

In additional or alternative aspects, a network controller or other network device can take action to disable the compromised network device. For example, a network controller can configure one or more uncompromised network devices to execute a denial-of-service attack directed at the network device. A denial-of-service attack can include the uncompromised network devices saturating the compromised network device with data such as communications requests. The volume of data transmitted to the compromised network device may exceed the typical volume of data that the compromised network device is configured to handle. The volume of transmitted data can, for example, cause the compromised network device to shut down or reset, thereby rendering the compromised network device unavailable for communicating unauthorized data via the data network.

In additional or alternative aspects, a network controller or other network device can continue communicating with the compromised network device. Communicating with the compromised network device can incentivize an intruder to continue sending data using the device. An intruder continuing to send data using the compromised network device can allow an administrator of the data network to identify the geographic location of the compromised network device or accumulate data documenting the misuse of the compromised network device.

These illustrative examples are given to introduce the reader to the general subject matter discussed here and are not intended to limit the scope of the disclosed concepts. The following sections describe various additional aspects and examples with reference to the drawings in which like numerals indicate like elements.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating an exemplary data network 100 having a network controller 102 in communication with network devices 104a-e.

The data network 100 can provide communication channels among the network controller 102 and the network devices 104a-e. A communication channel can include any suitable means capable of communicating signals among the network devices 104a-e and the network controller 102. Examples of suitable communication media include (but are not limited to), Ethernet cable, wireless data communication, power cables for use in power line communication ("PLC"), etc. Power line communication can include communicating signals via cables used for providing electric power from a utility company to buildings in a geographic area.

The data network 100 can be configured using any suitable network topology. For example, the data network 100 can be a mesh network. A data network 100 that is a mesh network can include each of the network devices 104a-e being configured to relay data received from other network devices, such that the network devices 104a-e collaborate to propagate the data through the data network 100. Other suitable network topologies can include (but are not limited to), a ring network, a star network, a bus network, etc.

The network controller 102 can be a network device configured to collect and process data from other network devices on the data network. The network controller 102 can provide a link between the data network 100 and other networks. Examples of a network controller 102 include, but are not limited to, a dedicated controller such as a server system, a router, or a network device similar to the network devices 104a-e and having an additional network controller capability. The network controller 102 can communicate data to each of the network devices 104a-e. The network controller 102 can remotely configure the network devices 104a-e via control signals communicated via the data network 100.

The network devices 104a-e can include any device communicating data via the data network 100. The network devices 104a-e can use an encryption protocol or other algorithm to encrypt and decrypt data communicated via the data network 100. Each of the network devices 104a-e can include one or more hardware components for physically interfacing with the data network 100, such as (but not limited to) a network interface controller. Each of the network devices 104a-e can include a computer readable medium or other suitable memory device. Each of the network devices 104a-e can include a processor configured to execute software instructions stored in the computer readable medium. The software instructions at each of the network devices 104a-e can include instructions for encrypting and decrypting data communicated via the data network 100.

Although FIG. 1 depicts a data network 100 having a single network controller 102 and five network devices 104a-e, any number of network controllers and/or network devices can be used. In additional or alternative aspects, a network controller can be omitted. For example, in a peer-to-peer data network, one or more of the functions that would otherwise be executed at the network controller 102 can be performed by one or more of the client network devices.

In an exemplary aspect, a data network 100 can be a PLC network, a network controller 102 can be a command center, and each of the network devices 104a-e can be a power meter. Each power meter can be configured to record data describing the consumption of electrical power at the geographic location of the network device. Each power meter can communicate data describing the consumption of electrical power via PLC network. Each power meter can communicate the data to the command center that monitors electrical power consumption at each geographic location.

In an exemplary data network 100, one or more of the network devices 104a-e may be physically located in a geographic area over which an administrator of the data network 100 cannot exercise physical control or other means of physically securing the network devices 104a-e. The network devices 104a-e located in such areas may be susceptible to tampering. For example, a utility company may use power meters communicating via a PLC network to monitor power consumption at buildings under the control of customers of the utility company. Because the power meters are located on private property, the utility company is limited in the type of physical safeguards that could be employed to prevent tampering with the power meters.

An intruder seeking to access a data network 100 can compromise one of the network devices 104a-e. The intruder can disassemble or otherwise access a network device and download or otherwise retrieve the data stored in the memory of the network device. The intruder can analyze the data stored in the memory of the network device to identify a cryptographic key used by the network device to communicate encrypted data over the data network 100.

The intruder can use the cryptographic key to decrypt encrypted data intercepted by the intruder and/or to communicate unauthorized data via the data network 100. For example, if a network device is a power meter communicating electrical power consumption at a geographic location, the intruder can defraud a utility company providing the electrical power by injecting incorrect data regarding the electrical power consumption into the data network.

The compromise of a network device by an intruder can be detected by including a decoy cryptographic key in the memory of the network device.

Figure 2:
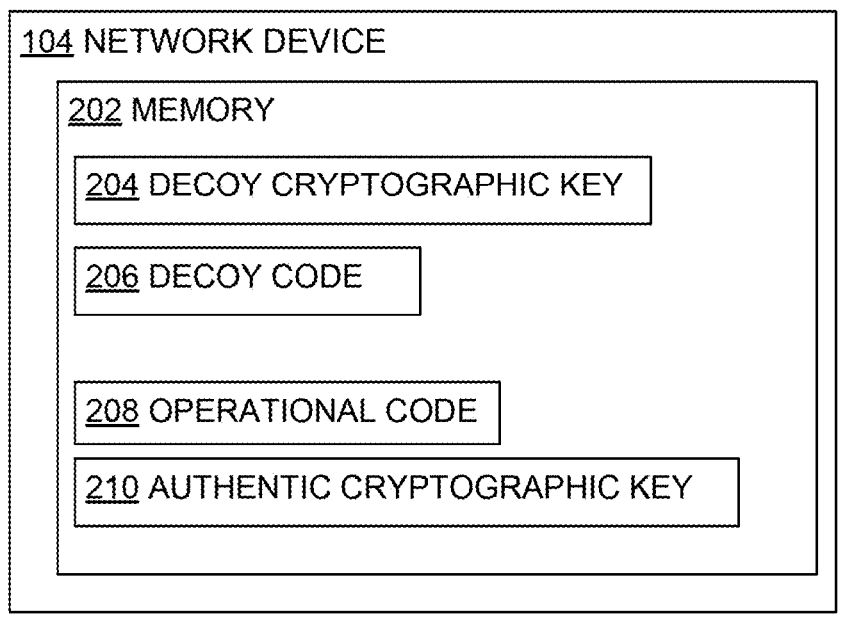
FIG. 2 is a block diagram illustrating an exemplary network device having a decoy cryptographic key.

FIG. 2 is a block diagram illustrating an exemplary network device 104 having a decoy cryptographic key. The network device 104 can include a memory 202. The memory 202 can include the decoy cryptographic key 204, decoy code 206, operational code 208, and an authentic cryptographic key 210.

The operational code 208 can include software controlling the operation of the network device 104. The operational code 208 can include, for example, an operating system for the network device 104, one or more cryptographic modules for encrypting and decrypting data communicated via the data network 100, and/or one or more software modules for processing data at the network device 104. For example, a network device 104 can be a power meter having one or more software modules for recording, processing, and communicating power consumption data at the geographic location of the power meter. The operational code 208 can use an authentic cryptographic key 210 stored in the memory 202 to encrypt and decrypt data communicated via the data network 100.

The decoy cryptographic key 204 can be a cryptographic key stored in the memory 202 for the purpose of identifying unauthorized network access via the network device 104. The decoy cryptographic key 204 can be a series of random data generated by, for example, a random number generator. Examples of a random number generator for generating a decoy cryptographic key can include (but are not limited to) a true random number generator noise source, a deterministic random number generator, or a cryptographically weak random number generator. In some embodiments, the decoy cryptographic key can be generated using high entropy data.

The decoy cryptographic key 204 can be stored as high entropy data in a region of the memory 202 having additional high entropy data. High entropy data can include, for example, data having extensive variance or less order. The presence of high entropy data can indicate the presence of encrypted data because encrypting data can increase the entropy of the data. A decoy cryptographic key 204 stored in a portion of the memory 202 having high entropy data, which is typically associated with the presence of encrypted data, can indicate to an intruder that a cryptographic key is located in that portion of the memory 202. Including the decoy cryptographic key in a portion of the memory 202 having high entropy data can thus induce an intruder to use the decoy cryptographic key 204 for communicating via the data network 100.

The decoy code 206 can include one or more software modules stored in the memory 202 that can be used with the decoy cryptographic key 204 to generate encrypted data. Including the decoy code 206 in the memory 202 can indicate to an intruder that the high entropy or other random data comprising the decoy cryptographic key 204 is a functional cryptographic key capable of encrypting and decrypting data communicate via the data network 100. For example, the decoy code 206 can include a reference to the decoy cryptographic key 204, such as a reference identifying the region of the memory 202 in which the decoy cryptographic key 204 is stored. Such a reference can encourage an intruder to conclude that the random data comprising the decoy cryptographic key 204 is in fact a functional cryptographic key.

The decoy code 206 can include features rendering the decoy code 206 attractive to an intruder. For example, the decoy code 206 can include comments or other annotations for explaining the purpose of the code. The comments can identify one or more expected results when the decoy code 206 is used with the decoy cryptographic key 204. An intruder accessing the network device 104 can use the comments to verify the expected results of using the decoy code 206 with the decoy cryptographic key 204. The intruder can thus be encouraged to use the decoy cryptographic key 204 for encrypting data communicated via the data network 100.

In additional or alternative aspects, the authentic cryptographic key 210 and operational code 208 can be obfuscated. For example, the authentic cryptographic key 210 can be obfuscated in the operational code 208 such that the authentic cryptographic key 210 appears to be something other than a cryptographic key, such as normal processing code. The operational code 208 can be obfuscated by removing features that provide information regarding the function of the operational code 208 such as comments, debugging code, and test code. Accordingly, the decoy cryptographic key 204 and the decoy code 206 having extensive commenting can be easier for an intruder accessing the network device 104 to locate and test than the authentic cryptographic key 210 and the operational code 208.

An intruder can thus be induced to use the decoy cryptographic key 204 for communicating via the data network 100. Another system in the data network 100, such as an uncompromised network device or the network controller 102, can receive data encrypted using the decoy code 206. The system receiving the data encrypted using the decoy code 206 can determine that an intruder is accessing the data network 100 using the compromised network device.

Figure 3:
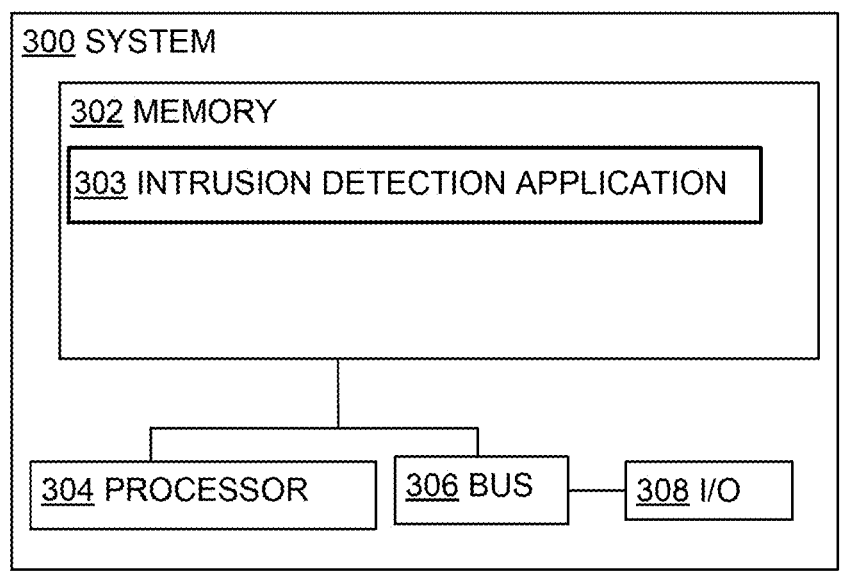
FIG. 3 is a block diagram depicting exemplary computing devices in an exemplary computing environment for implementing intrusion detection features.

FIG. 3 is a block diagram depicting exemplary computing devices in an exemplary computing environment for implementing intrusion detection features. An intrusion detection application 303 executes or is otherwise used on the exemplary system 300 and is shown using functional components or modules. The exemplary system 300 can include or be disposed in one or more of the network devices 104a-e and/or the network controller 102. For example, a network controller 102 or one of the network devices 104a-e can include both the components stored in memory as depicted in FIG. 2 and the system components as depicted in FIG. 3. As is known to one of skill in the art, such an application may be resident in any suitable non-transitory computer-readable medium and can be executed on any suitable processor.

For example, as shown, an exemplary system 300 can include a non-transitory computer-readable medium, such as a random access memory (RAM) 302, coupled to a processor 304 that executes computer-executable program instructions and/or accesses the intrusion detection application stored in a memory 302. Such a processor 304 may include a microprocessor, an application-specific integrated circuit (ASIC), a state machine, or other processor, and can be any of a number of computer processors. Such a processor can include, or may be in communication with, a non-transitory computer-readable medium which stores instructions that, when executed by the processor 304, cause the processor 304 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The system 300 can receive input and provide output via an input/output (I/O) interface 308. I/O interface 308 can include, for example, a network interface for communication via the data network 100. A bus, such as bus 306, is included in the system 300. The system 300 can be any type of computing system included in a network at a domain appropriate for providing one or more of the features described herein.

FIG. 3 illustrates an exemplary system 300 that includes, in a memory 302, the intrusion detection application 303. The intrusion detection application 303 can configure the processor 304 to execute one or more operations associated with detecting that a network device 104 has been compromised. The intrusion detection application 303 can configure the processor 304 to execute one or more operations alerting other network devices that the compromised network device 104 has been compromised and/or isolating the compromised network device 104.

Figure 4:
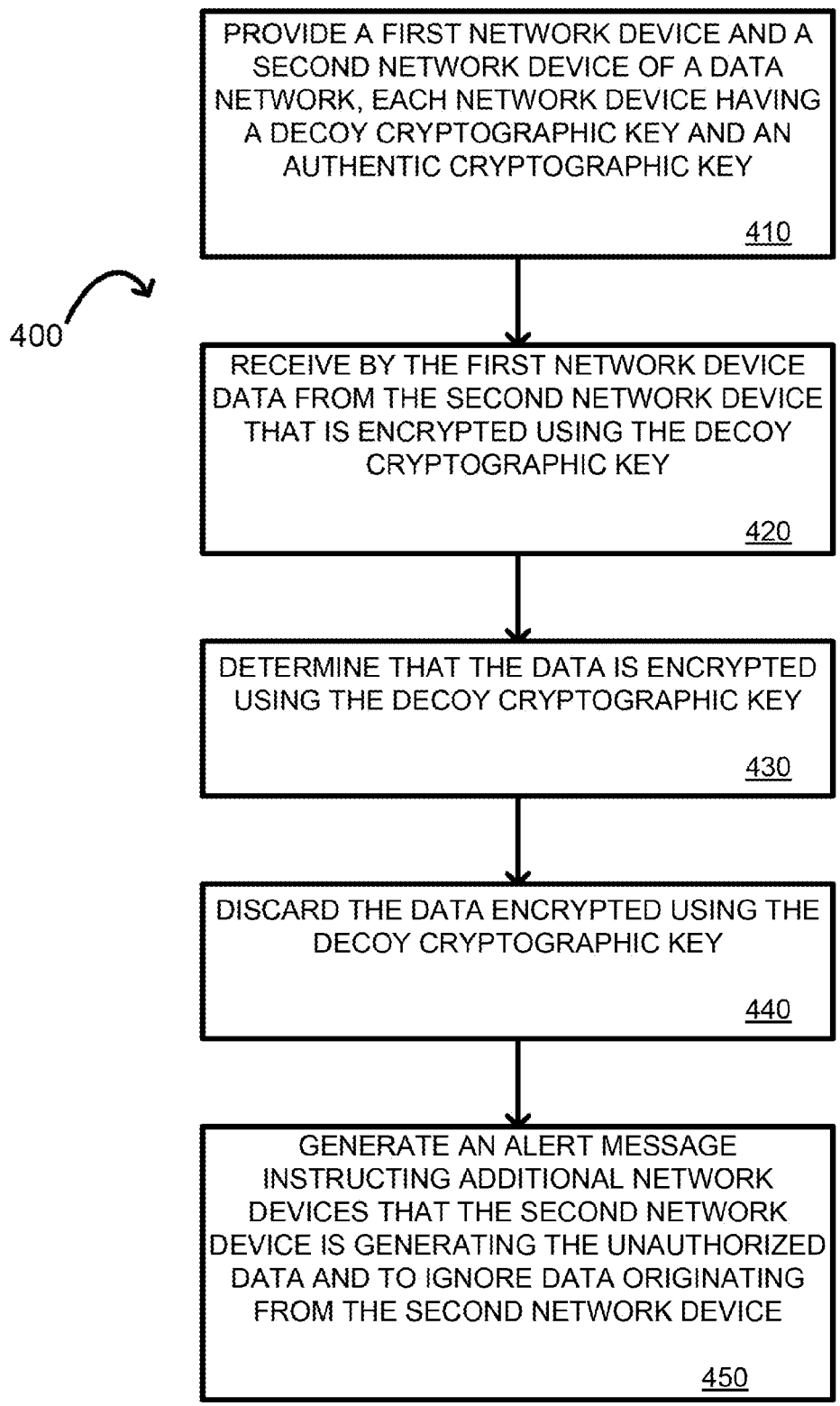
FIG. 4 is a flow chart illustrating an exemplary method of using a decoy cryptographic key to detect an intrusion into a data network.

FIG. 4 is a flow chart illustrating an exemplary method 400 of using a decoy cryptographic key 204 to detect an intrusion into a data network 100. For illustrative purposes, the method 400 is described with reference to the system implementation depicted in FIG. 3. Other implementations, however, are possible.

The exemplary method 400 involves providing a first network device and a second network device, as shown in block 410. Each of the first and second network devices can be a network device 104 having a decoy cryptographic key 204 and an authentic cryptographic key 210.

The exemplary method 400 further involves receiving by the first network device data from the second network device, as shown in block 420. The intrusion detection application 303, executed by a processor 304 at a first network device, can receive the data. The data can be encrypted using the decoy cryptographic key 204.

The exemplary method 400 further involves determining that the data is encrypted using the decoy cryptographic key 204, as shown in block 430. The intrusion detection application 303, executed by a processor 304 at the first network device can determine that the data from the second network device is encrypted using the decoy cryptographic key 204.

In an exemplary aspect, determining that the data is encrypted using the decoy cryptographic key 204 can include successfully decrypting the data using the decoy cryptographic key 204. The intrusion detection application 303 can attempt to decrypt the data received from the second network device using an authentic cryptographic key 210. Upon failing to decrypt the data using the authentic cryptographic key 210, the intrusion detection application 303 can determine that the authentic cryptographic key 210 cannot be used to decrypt the data. The intrusion detection application 303 can decrypt the data using the decoy cryptographic key 204. Decrypting the data using the decoy cryptographic key 204 can indicate that the second network device is compromised.

The exemplary method 400 further involves discarding the data that is encrypted using the decoy cryptographic key 204, as shown in block 440. The first network device can delete or otherwise discard the data received from the second network device. The processor 304 of the first network device can be configured to cause the first network device to delete or otherwise discard any data decrypted using the decoy cryptographic key 204. Deleting or otherwise discarding the data received from the second network device can effectively isolate the second network device from the network.

The exemplary method 400 further involves generating an alert message that the network device 104 is generating the unauthorized data, as shown in block 450. The intrusion detection application 303 can generate the alert message. The alert message can instruct additional network devices of the data network that the second network device is generating the unauthorized data. The alert message can also instruct the additional network devices to ignore data originating from the second network device.

In an exemplary aspect, the alert message can include a device identifier for the compromised network device 104. An example of such a device identifier is a Media Access Control ("MAC") address assigned to a network interface controller of each of the network devices 104a-e. The intrusion detection application 303 can notify the network controller 102 that the compromised network device 104 is generating unauthorized data by providing the alert to the network controller 102.

In additional or alternative aspects, the alert message can be used to isolate the compromised network device 104. Isolating the compromised network device 104 can include preventing the compromised network device 104 from transmitting unauthorized data via the data network 100. The intrusion detection application 303 can provide the alert message to one or more additional network devices. The alert message can include an instruction to the one or more additional network devices to cease routing data originating from the compromised network device 104. For example, the one or more additional network devices can delete any data packet including a device identifier identifying the compromised network device 104.

In additional or alternative aspects, the intrusion detection application 303 can analyze data generated by the compromised network device 104 to verify that the compromised network device 104 is generating fraudulent or otherwise unauthorized data. In response to one of the network devices detecting that the compromised network device has sent at least one data packet encrypted using the decoy cryptographic key 204, the intrusion detection application 303 can analyze data generated by the compromised network device. The intrusion detection application 303 can analyze the data generated by the compromised network device by comparing the data to a data profile associated with the network device. The intrusion detection application 303 can determine that the plurality of data unexpectedly differs from the data profile. The intrusion detection application 303 can generate the alert message based on determining that the plurality of data differs from the data profile.

For example, a data network 100 can include network devices 104a-e that are power meters in communication with a network controller 102 that is a command center monitoring power usage. A data profile for each of the network devices 104a-e can include an expected power usage at the geographic location associated with the network device based on historical power consumption data provided by the network device to the network controller 102. In some aspects, the network controller 102 can provide the data profile to the network device detecting the use of the decoy cryptographic key 204. The intrusion detection application 303 executed on the network device detecting the use of the decoy cryptographic key 204 can analyze the power consumption data transmitted by the compromised network device to the power consumption history. In other aspects, the network device detecting the use of the decoy cryptographic key 204 can provide the power consumption data transmitted by the compromised network device to the network controller 102. The network controller 102 can analyze the power consumption data based on the power consumption history stored in memory at the network controller 102.

In additional or alternative aspects, the intrusion detection application 303 can determine the geographic location of the compromised network device. Determining the geographic location of the compromised network device can allow an administrator of the data network 100 to execute one or more corrective actions to prevent the intruder from accessing the data network 100, such as notifying law enforcement of the intruder's activities and geographic location.

In some aspects, the intrusion detection application 303 can receive a device identifier associated with the compromised network device 104. The data describing the device identifier associated with the compromised network device 104 can be stored in the memory 302 or be accessed from a remote location by the intrusion detection application 303. For example, the intrusion detection application 303 can access a data file stored in the memory 302 or request data from the network controller 102 that includes the geographic locations associated with the received device identifier. The intrusion detection application 303 can determine the geographic location of the compromised network device by referencing geographic location data associated with the device identifier of the compromised network device. The intrusion detection application 303 can include the geographic location associated with the compromised network device with the alert message.

In other aspects, the intrusion detection application 303 can determine the geographic location of the compromised network device 104 in real time. The intrusion detection application 303 can direct at least two uncompromised network devices to send a test signal to the compromised network device. For example, a network controller 102 executing the intrusion detection application 303 can send a control message to two network devices directing each of the network devices to send a "ping" message to the compromised network device. Each of the network devices can provide data to the network controller 102 identifying the time elapsed between transmitting the test signal to the compromised network device 104 and receiving a reply from the compromised network device 104. The intrusion detection application 303 can determine a distance between the compromised network device 104 and each of the other network devices based on the elapsed time and an estimate of the speed of a data packet communicated via the data network 100. The intrusion detection application 303 can triangulate the position of the compromised network device 104 based on the distance between the compromised network device 104 and each of the first and second network devices and the geographic locations of the first and second network devices.

In additional or alternative aspects, the intrusion detection application 303 can take action to disable the compromised network device 104. The intrusion detection application 303 can configure one or more uncompromised network devices to execute a denial-of-service attack directed at the compromised network device 104. A denial-of-service attack can include the uncompromised network devices saturating the compromised network device 104 with data. The volume of data transmitted to the compromised network device 104 may exceed the typical volume of data that the compromised network device 104 is configured to handle. The volume of transmitted data can, for example, cause the compromised network device 104 to shut down or reset, rendering the compromised network device 104 unavailable for use by the intruder to communicate unauthorized data via the data network 100.

In additional or alternative aspects, an intrusion detection application 303 can continue communicating with the compromised network device 104. Communicating with the compromised network device 104 can induce an intruder to continue communicating unauthorized data via compromised network device 104. The intrusion detection application 303 can send an alert message to all uncompromised network devices to delete or otherwise ignore data originating from the compromised network device. Inducing an intruder to continue sending data using compromised network device 104 can allow a system administrator to identify the geographic location of the compromised network device 104 or accumulate data documenting the unauthorized use of the compromised network device 104 by the intruder for subsequent prosecution of the intruder.

GENERAL

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method comprising:
   providing a first network device and a second network device of a data network, each of the first network device and the second network device having a decoy cryptographic key and an authentic cryptographic key, wherein the decoy cryptographic key is used to detect unauthorized data being transmitted in the data network, wherein the authentic cryptographic key is used to encrypt authorized data being transmitted in the data network, wherein providing the first network device and the second network device comprises, for each of the first network device and the second network device:
      identifying a respective first region of a respective computer-readable medium as having respective high entropy data based on the respective high entropy data having greater variance than respective low entropy data in a respective second region of the respective computer-readable medium, and
      storing the decoy cryptographic key in the respective first region based on the respective high entropy data having the greater variance than the respective low entropy data;
   receiving, by the first network device, data from the second network device, wherein the data is encrypted using the decoy cryptographic key;
   determining, by the first network device, that the data is encrypted using the decoy cryptographic key by determining that the authentic cryptographic key cannot be used to decrypt the data and decrypting the data using the decoy cryptographic key; and
   discarding, by the first network device, the data encrypted using the decoy cryptographic key.

2. The method of claim 1, wherein providing the first network device and the second network device further comprises, for each of the first network device and the second network device:
   generating the decoy cryptographic key using additional high entropy data;
   storing decoy code capable of being used with the decoy cryptographic key in the respective computer-readable medium;
   storing the respective low entropy data in the respective second region of the respective computer-readable medium, wherein the respective low entropy data comprises operational code controlling the operation of a network device;
   storing the authentic cryptographic key in the respective second region of the respective computer-readable medium, wherein the authentic cryptographic key is obfuscated in the operational code.

3. The method of claim 1, further comprising generating, by the first network device, an alert message instructing one or more additional network devices that the second network device is generating the unauthorized data and to ignore data originating from the second network device.

4. The method of claim 3, wherein generating the alert message comprises providing a device identifier associated with the second network device to a network controller.

5. The method of claim 3, further comprising providing, by the first network device, the alert message to the one or more additional network devices, wherein the alert message comprises an instruction to the one or more additional network devices to cease routing one or more data originating from the second network device.

6. The method of claim 5, further comprising, prior to providing the alert message to the one or more additional network devices:
   comparing, by the first network device, a plurality of data received from the second network device to a data profile associated with the second network device; and
   determining, by the first network device, that the plurality of data differs from expected data determined from the data profile;
   wherein the alert message to the one or more additional network devices is based in part on determining that the plurality of data differs from the expected data and on the use of the decoy cryptographic key by the second network device.

7. The method of claim 1, further comprising determining, by the first network device, a geographic location of the second network device.

8. The method of claim 7, wherein determining the geographic location of the second network device comprises:
   determining, by the first network device, a distance from the second network device to each of a plurality of additional network devices; and
   determining, by the first network device, the geographic location based on a respective geographic location of each of the plurality of additional network devices and the distance from the second network device to each of the plurality of additional network devices.

9. A non-transitory computer-readable medium embodying program code executable by a computer system, the non-transitory computer-readable medium comprising:
   program code for providing a decoy cryptographic key to each of a first network device and a second network device of a data network, wherein the decoy cryptographic key is used to detect unauthorized data being transmitted in the data network, wherein providing the decoy cryptographic key comprises, for each of the first network device and the second network device:
      identifying a respective first region of a respective computer-readable medium as having respective high entropy data based on the respective high entropy data having greater variance than respective low entropy data in a respective second region of the respective computer-readable medium, and
      storing the decoy cryptographic key in the respective first region based on the respective high entropy data having the greater variance than the respective low entropy data;
   program code for receiving, by the first network device, data from the second network device, wherein the data is encrypted using a decoy cryptographic key, wherein the decoy cryptographic key is used to detect unauthorized data;
   program code for determining that the data is encrypted using the decoy cryptographic key by determining that the authentic cryptographic key cannot be used to decrypt the data and decrypting the data using the decoy cryptographic key; and program code for generating an alert message instructing one or more additional network devices that the second network device is generating the unauthorized data and to ignore data originating from the second network device.

10. The non-transitory computer-readable medium of claim 9, wherein the program code for generating the alert message comprises program code for providing a device identifier associated with the second network device to a network controller.

11. The non-transitory computer-readable medium of claim 9, further comprising program code for providing the alert message to one or more additional network devices, wherein the alert message comprises an instruction to the one or more additional network devices to cease routing one or more data originating from the second network device.

12. The non-transitory computer-readable medium of claim 11, further comprising:
program code for, prior to providing the alert message to the one or more additional network devices:
comparing a plurality of data received from the second network device to a data profile associated with the second network device; and
determining that the plurality of data differs from expected data determined from the data profile;
wherein the alert message to the one or more additional network devices is based in part on determining that the plurality of data differs from the expected data and on the use of the decoy cryptographic key by the second network device.

13. The non-transitory computer-readable medium of claim 12, wherein the plurality of data comprises power consumption data associated with the second network device, wherein the data profile comprises historical power consumption data associated with the second network device, and wherein the expected data comprises an expected power usage for the second network device.

14. The non-transitory computer-readable medium of claim 9, further comprising program code for determining a geographic location of the second network device.

15. The non-transitory computer-readable medium of claim 9, wherein the program code for determining a geographic location of the second network device comprises:
program code for determining a distance from the second network device to each of a plurality of additional network devices; and
program code for determining the geographic location based on a respective geographic location of each of the plurality of additional network devices and the distance from the second network device to each of the plurality of additional network devices.

16. A system comprising:
a first network device having a decoy cryptographic key and an authentic cryptographic key, wherein the decoy cryptographic key is used to detect unauthorized data being transmitted in a data network, wherein the authentic cryptographic key is used to encrypt authorized data being transmitted in the data network, wherein the first network device is configured for:
determining that data received from a second network device is encrypted using the decoy cryptographic key by determining that the authentic cryptographic key cannot be used to decrypt the data and decrypting the data using the decoy cryptographic key, and
transmitting an alert message that the second network device is using the decoy cryptographic key;
a network controller comprising:
a network interface configured to communicate with the first network device via the data network;
a processor configured to execute instructions stored in a non-transitory computer-readable medium providing an intrusion detection application, wherein the intrusion detection application comprises one or more modules configured to perform operations comprising:
receiving the alert message from the first network device that the second network device is using the decoy cryptographic key, and
based on receiving the alert message, configuring one or more additional network devices of the data network to cease communicating with the second network device; and
at least one device configured for providing the decoy cryptographic key to each of the first network device and the second network device, wherein providing the decoy cryptographic key comprises, for each of the first network device and the second network device:
identifying a respective first region of a respective computer-readable medium as having respective high entropy data based on the respective high entropy data having greater variance than respective low entropy data in a respective second region of the respective computer-readable medium, and
storing the decoy cryptographic key in the respective first region based on the respective high entropy data having the greater variance than the respective low entropy data.

17. The system of claim 16, wherein the one or more modules of the network controller are configured to perform additional operations comprising:
providing a data profile associated with the second network device to the first network device;
configuring the first network device to compare a plurality of data received from the second network device to the data profile; and
configuring the first network device to determine that the plurality of data differs from expected data determined from the data profile;
wherein the alert message to the one or more additional network devices is generated responsive to determining that the plurality of data differs from the data profile.

18. The system of claim 16, wherein the one or more modules are configured to perform additional operations comprising configuring a plurality of network devices in communication with the network controller to execute a denial-of-service attack directed to the second network device.

19. The method of claim 1, wherein the data is discarded based on the data being successfully decrypted using the decoy cryptographic key rather than the authentic cryptographic key.

20. The method of claim 2, further comprising generating the decoy code, wherein the decoy code comprises executable code for performing an operation that performs at least one encryption or decryption operation using the decoy cryptographic key.

* * * * *